United States Patent
Minegishi et al.

(10) Patent No.: US 11,947,347 B2
(45) Date of Patent: Apr. 2, 2024

(54) MAINTENANCE MANAGEMENT METHOD, MAINTENANCE MANAGEMENT DEVICE AND MAINTENANCE MANAGEMENT PROGRAM

(71) Applicant: KONICA MINOLTA, INC., Tokyo (JP)

(72) Inventors: Ryo Minegishi, Hino (JP); Akihiro Suzuki, Tama (JP); Seiichi Tsuzuki, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 15 days.

(21) Appl. No.: 17/618,551

(22) PCT Filed: Jun. 19, 2020

(86) PCT No.: PCT/JP2020/024077
§ 371 (c)(1),
(2) Date: Dec. 13, 2021

(87) PCT Pub. No.: WO2020/256092
PCT Pub. Date: Dec. 24, 2020

(65) Prior Publication Data
US 2022/0244720 A1 Aug. 4, 2022

(30) Foreign Application Priority Data
Jun. 20, 2019 (JP) .................. 2019-114517

(51) Int. Cl.
*G05B 23/02* (2006.01)
*G06Q 50/06* (2012.01)

(52) U.S. Cl.
CPC ..... *G05B 23/0283* (2013.01); *G05B 23/0221* (2013.01); *G05B 23/0262* (2013.01); *G06Q 50/06* (2013.01)

(58) Field of Classification Search
CPC ............ G05B 23/0283; G05B 23/0221; G05B 23/0262; G06Q 50/06
See application file for complete search history.

(56) References Cited

U.S. PATENT DOCUMENTS

| | | | |
|---|---|---|---|
| 2002/0046048 A1* | 4/2002 | Fukushima ........ | G05B 23/0283 709/223 |
| 2002/0072943 A1 | 6/2002 | Usami et al. | |

(Continued)

FOREIGN PATENT DOCUMENTS

| | | |
|---|---|---|
| JP | 2001306679 A | 11/2001 |
| JP | 2002157360 A | 5/2002 |

(Continued)

OTHER PUBLICATIONS

International Search Report (ISR) (and English language translation thereof) dated Sep. 24, 2020, issued in International Application No. PCT/JP2020/024077.

(Continued)

*Primary Examiner* — Manuel A Rivera Vargas
(74) *Attorney, Agent, or Firm* — Holtz, Holtz & Volek PC (57) ABSTRACT

A maintenance management method is capable of reducing a burden on work takeover, and is a maintenance management method related to maintenance management of a production facility related to gas or oil. In the maintenance management method, a computer acquires producer information regarding a producer that owns or manages the production facility, production facility information regarding the production facility, an inspection record in a case where inspection is performed on the production facility, and maintainer candidate information regarding a maintainer candidate that performs maintenance on the production facility. Further, the computer determines whether or not maintenance for the production facility is necessary on the basis of the inspection record, and performs control to (Continued)

communicate information regarding maintenance for the production facility to at least one of the producer and the maintainer candidate, when determining that maintenance is necessary.

13 Claims, 4 Drawing Sheets

(56) References Cited

U.S. PATENT DOCUMENTS

| | | |
|---|---|---|
| 2013/0332383 A1 | 12/2013 | Anzai et al. |
| 2016/0292802 A1* | 10/2016 | Tada .................. G06Q 10/0631 |
| 2017/0228702 A1* | 8/2017 | Boult ................. G05B 23/0283 |
| 2018/0052072 A1 | 2/2018 | Koh |
| 2020/0278671 A1* | 9/2020 | Funahashi .............. G06Q 10/20 |

FOREIGN PATENT DOCUMENTS

| | | |
|---|---|---|
| JP | 2002236736 A | 8/2002 |
| JP | 2012150686 A | 8/2012 |
| WO | 2016143754 A1 | 9/2016 |

OTHER PUBLICATIONS

Written Opinion dated Sep. 24, 2020, issued in International Application No. PCT/JP2020/024077.

* cited by examiner

FIG. 4

MAINTENANCE MANAGEMENT METHOD, MAINTENANCE MANAGEMENT DEVICE AND MAINTENANCE MANAGEMENT PROGRAM

TECHNICAL FIELD

The present invention relates to a maintenance management method, a maintenance management device, and a maintenance management program

BACKGROUND ART

For example, in production equipment for producing natural gas or oil or a production plant for producing chemical products using gas, pipes and devices through which gas flows are disposed in a vast site. Hereinafter, the production equipment and the production plant are referred to as "production facilities".

Gas leakage in production facilities may cause, for example, explosions, progress of global warming, or adverse effect on health. Therefore, an inspector regularly goes around in the site to inspect gas leakage in the production facility. In addition, the inspection of the production facility is also performed at a time of an abnormality such as an earthquake.

For example, Patent Literature 1 discloses a gas leakage detection device that detects gas leakage in an inspection region by using infrared absorption characteristics of gas.

CITATION LIST

Patent Literature

Patent Literature 1: WO 2016/143754 A

SUMMARY OF INVENTION

Technical Problem

Meanwhile, production facilities of petroleum and chemical systems mainly in developed countries are becoming old. Therefore, aged deterioration progresses, and there is a concern that a combustible material leaks from a point that has not been expected so far. For this reason, the risk of leakage of the combustible material is increased even in a place where the inspection has not been necessary conventionally, and the necessity of the inspection is increased.

In addition, the number of mining wells for shale oil and shale gas is explosively increasing mainly in the United States, and production facilities to be inspected are rapidly increasing.

As described above, since production facilities are rapidly increasing, inspection and records of inspection results, and takeover work (post-processing) after inspection are rapidly increasing.

Here, a content of the takeover work described above means, for example, in a case where the production facility is rental equipment or in a case where an inspector is a contractor, contacting a facility manager in accordance with an inspection point and a failure situation thereof since the inspector cannot repair a point on the spot when the inspector finds the point requiring repair on the production facility. In addition, the content of the takeover work means selecting a necessary business operator, contacting the selected business operator, and requesting handling of repair. In addition, the content of the takeover work means inspecting again as to whether or not the abnormality is resolved after repair completion.

However, although the takeover work is work that is not related to original inspection work for ensuring safety, a burden on the takeover is increasing as shown in the contents of the takeover work described above. Eliminating an increase in the burden on the takeover is an important issue in maintenance management operations of production facilities.

An object of the present invention is to provide a maintenance management method, a maintenance management device, and a maintenance management program capable of reducing a burden on takeover of work.

Solution to Problem

In order to achieve the above object, a maintenance management method according to the present invention is
a maintenance management method related to maintenance management of a production facility related to gas or oil, the maintenance management method including:
acquiring, by a computer, producer information regarding a producer that owns or manages the production facility, production facility information regarding the production facility, an inspection record in a case where inspection is performed on the production facility, and maintainer candidate information regarding a maintainer candidate that performs maintenance on the production facility, and
determining, by the computer, whether or not maintenance for the production facility is necessary based on the inspection record, and executing control to communicate information regarding maintenance for the production facility to at least one of the producer or the maintainer candidate, when determining that maintenance is necessary.

A maintenance management device includes:
a storage unit that stores producer information regarding a producer that owns or manages a production facility related to gas or oil, production facility information regarding the production facility, an inspection record including information as to whether or not maintenance for the production facility is necessary in a case where inspection of the production facility is performed, and maintainer candidate information regarding a maintainer candidate that performs maintenance on the production facility;
an acquisition unit that acquires the inspection record from the storage unit; and
an output unit that outputs information regarding maintenance for the production facility to at least one terminal of a terminal related to the producer or a terminal related to the maintainer candidate, in a case where the inspection record indicating that maintenance for the production facility is necessary is acquired.

A maintenance management program causes a computer to execute:
a process of acquiring producer information regarding a producer that owns or manages a production facility related to gas or oil, production facility information regarding the production facility, an inspection record including information as to whether or not maintenance for the production facility is necessary in a case where inspection of the production facility is performed, and maintainer candidate information regarding a maintainer candidate that performs maintenance on the production facility; and a process of outputting information regarding maintenance for the production facility to at least one terminal of a terminal related to the producer or a terminal related to the maintainer candidate, in a case where the inspection record indicating that maintenance for the production facility is necessary is acquired.

Advantageous Effects of Invention

According to the present invention, it is possible to reduce a burden on takeover of work.

BRIEF DESCRIPTION OF DRAWINGS

FIG. 4 is a view illustrating a specific example of display processing of an inspection plan and the like.

DESCRIPTION OF EMBODIMENTS

An embodiment of the present invention will be described below with reference to the drawings.

Hereinafter, the present invention will be described with reference to the embodiment. In the present embodiment, a description is given to an example of a configuration of an inspection support system 100 that supports gas leakage inspection of a production facility that produces natural gas or oil. Note that the inspection support system 100 according to the present embodiment includes a maintenance management device that performs maintenance management including maintenance for the production facility after gas leakage inspection.

Figure 1:
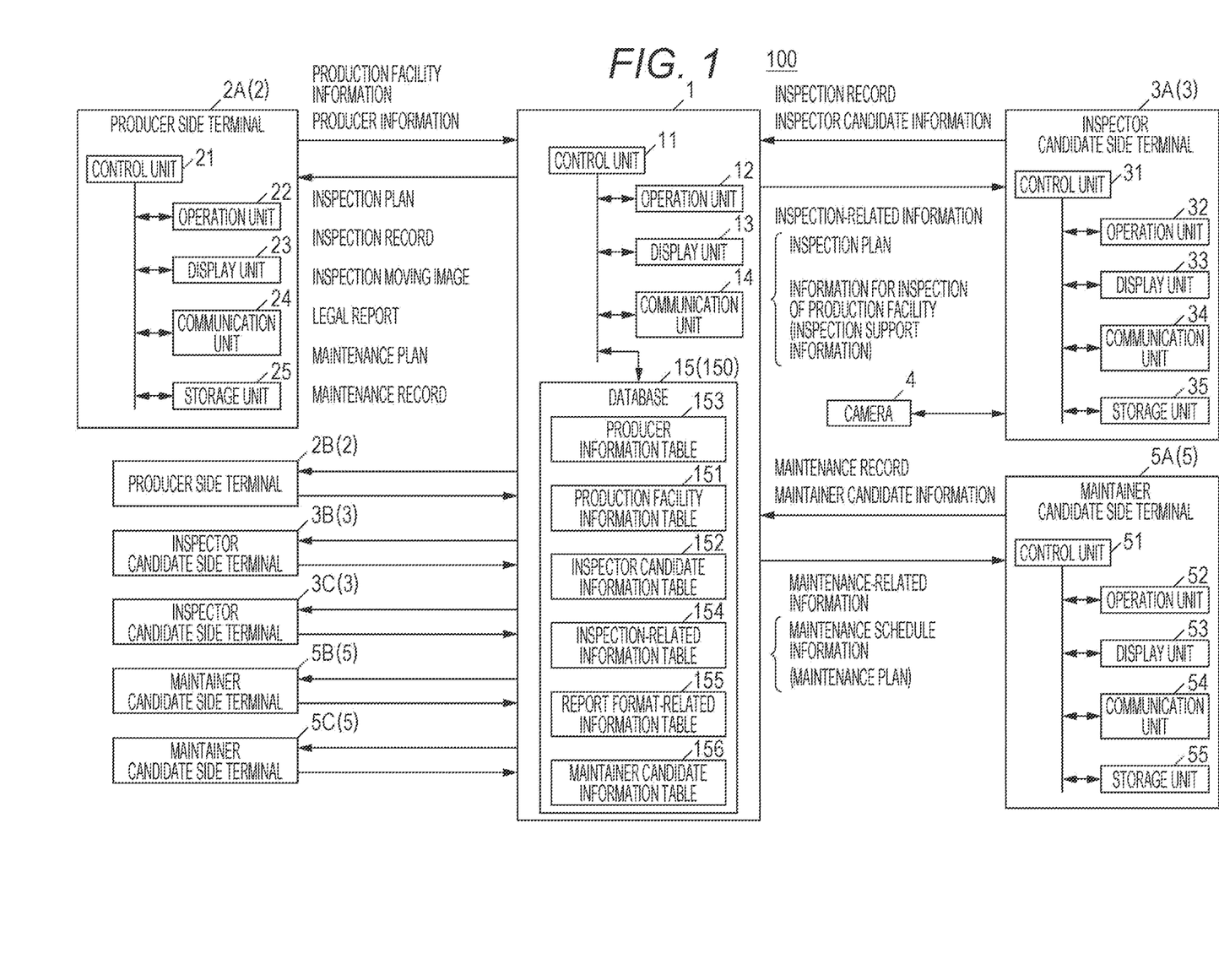
FIG. 1 is a block diagram illustrating a configuration of an inspection support system including a maintenance management device according to an embodiment of the present invention.

FIG. 1 is a block diagram illustrating an example of a configuration of the inspection support system 100 including the maintenance management device according to the present embodiment. The inspection support system 100 is a system that individually provides various types of information regarding inspection of a production facility, to a plurality of companies that own or manage the production facility and a plurality of inspectors or inspection companies that inspect the production facility. In addition, the inspection support system 100 is a system that individually provides various types of information regarding maintenance for the production facility, to a plurality of companies that own or manage the production facility and a plurality of maintainers or maintenance companies that perform maintenance on the production facility. Here, the production facility is production equipment related to oil/gas, specifically is a production facility that produces natural gas or oil, or a production facility that produces chemical products using gas, and more specifically, for example, a well facility or a gas piping facility.

In the present embodiment, the company that manages the production facility registers company information and information regarding the production facility to be managed in an inspection support device 1 by using the inspection support system 100. The inspector or the inspection company registers information regarding the inspector or the inspection company in the inspection support device 1 by using the inspection support system 100. The inspection support system 100 selects an inspector or an inspection company satisfying a predetermined condition from among a plurality of registered inspectors or inspection companies. The maintainer or the maintenance company registers information regarding the maintainer or the maintenance company in the inspection support device 1 by using the inspection support system 100. The inspection support system 100 selects a maintainer or a maintenance company satisfying a predetermined condition from among a plurality of registered maintainers or maintenance companies. Note that, in the following description, a "company that manages a production facility" is referred to as a "producer". In addition, an inspector or an inspection company is referred to as an "inspector" as a representative. Further, an inspector before being selected by the inspection support system 100 is particularly referred to as an "inspector candidate". Further, gas leakage inspection of the production facility is simply referred to as "inspection". Further, repair of a gas leakage point for the production facility is simply referred to as "repair", weeding in the production facility is simply referred to as "weeding", and the repair and the weeding are collectively referred to as "maintenance". Further, a maintainer or a maintenance company is referred to as a "maintainer" as a representative. In addition, a maintainer before being selected by the inspection support system 100 is particularly referred to as a "maintainer candidate".

The inspection support system 100 includes the inspection support device 1, a producer side terminal 2, an inspector candidate side terminal 3, and a maintainer candidate side terminal 5. The producer side terminal 2 is arranged for each producer, and producer side terminals 2A and 2B are individually arranged for different producers. This similarly applies to the inspector candidate side terminal 3, and inspector candidate side terminals 3A, 3B, and 3C are individually arranged for different inspectors. This similarly applies to the maintainer candidate side terminal 5, and maintainer candidate side terminals 5A, 5B, and 5C are individually arranged for different maintainers. Note that the numbers of producer side terminals 2, inspector candidate side terminals 3, and maintainer candidate side terminals 5 illustrated in FIG. 1 are examples, and there are as many as the numbers of registered producers, inspectors, and maintainers. In addition, a plurality of terminals may be arranged for one producer, inspector, or maintainer. Further, the number of cameras 4 is also an example, and a plurality of cameras 4 may be associated with one inspector candidate side terminal 3.

Communication between the inspection support device 1 and the producer side terminals 2A and 2B is performed via, for example, an Internet network (not illustrated). Further, communication between the inspection support device 1 and the inspector candidate side terminals 3A, 3B, and 3C is performed via, for example, an Internet network (not illustrated). Further, communication between the inspection support device 1 and the maintainer candidate side terminals 5A, 5B, and 5C is performed via, for example, an Internet network (not illustrated).

The inspection support device 1 is, for example, a server device, and includes a control unit 11, an operation unit 12, a display unit 13, a communication unit 14, and a storage unit 15. Each unit is connected by a bus.

The control unit 11 includes a central processing unit (CPU), a random access memory (RAM), and the like. The CPU of the control unit 11 reads various programs such as a system program and a processing program stored in the storage unit 15, develops the programs into the RAM, and executes various types of processing according to the developed programs. The control unit 11 executes various types of processing to function as a production facility information acquisition unit (to be described later), an inspector candidate information acquisition unit (to be described later), an inspection-related information output unit (to be described later), a past inspection information acquisition unit (to be described later), an inspection support information output unit (to be described later), a maintainer candidate information acquisition unit (to be described later), and a maintenance-related information output unit (to be described later). Further, in response to a connection request from the producer side terminals 2A and 2B to the inspection support device 1, the control unit 11 determines whether or not to permit connection on the basis of an ID and a connection password issued for each producer, and permits connection when a connection condition is satisfied. In response to a connection request from the inspector candidate side terminals 3A, 3B, and 3C to the inspection support device 1, the control unit 11 determines whether or not to permit connection on the basis of an ID and a connection password issued for each inspector, and permits connection when a connection condition is satisfied. In response to a connection request from the maintainer candidate side terminals 5A, 5B, and 5C to the inspection support device 1, the control unit 11 determines whether or not to permit connection on the basis of an ID and a connection password issued for each maintainer, and permits connection when a connection condition is satisfied. The control unit 11 also functions as an authentication unit.

The operation unit 12 includes a keyboard including character input keys, numeric input keys, various function keys, and the like, and a pointing device such as a mouse, and outputs a pressing signal of a key pressed in the keyboard and an operation signal by the mouse, to the control unit 11 as input signals.

The display unit 13 includes, for example, a monitor such as an LCD. The display unit 13 displays various screens in accordance with an instruction of a display signal inputted from the control unit 11.

The communication unit 14 includes, for example, a LAN card or the like. The communication unit 14 transmits and receives data to and from an external device connected to a communication network via a switching hub, for example.

The storage unit 15 includes, for example, a hard disk drive (HDD), a semiconductor non-volatile memory, or the like. The storage unit 15 stores various programs as described above.

In addition, the storage unit 15 is provided with a database 150. The database 150 has a production facility information table 151 that stores production facility information regarding production facilities. The production facility information table 151 stores information regarding each production facility as one record. The information regarding the production facility includes: a location; a business company (producer) that owns or manages; age; facility scale; operation/non-operation; an inspection timing of the production facility; and an inspection record (added at each when inspection is performed). Note that, in the following description, a past inspection timing at which the inspection of the production facility ends is referred to as an inspection timing (past), and a scheduled inspection timing at which the inspection of the production facility is scheduled is referred to as an inspection timing (future). The inspection timing (future) includes a desired inspection timing at which the producer freely desires to inspect the production facility, in addition to a periodic inspection timing including a legal inspection timing. Except for the inspection record and a maintenance record, the information regarding the production facility is mainly inputted by the producer via the producer side terminal 2 and registered in the database 150. The inspection record is inputted by the inspector via a terminal on the inspector side and registered in the database 150. Note that the terminal on the inspector side means both an inspector side terminal owned by the inspector that performs inspection on the production facility and the inspector candidate side terminal 3 owned by the inspector candidate. The individual terminals are the same in terms of terminals owned by the inspection side, and have the same functions as an input terminal or an output terminal. The maintenance record is inputted by the maintainer via a terminal on the maintainer side and registered in the database 150. Note that the terminal on the maintainer side means both a maintainer side terminal owned by the maintainer that performs maintenance on the production facility and the maintainer candidate side terminal 5 owned by the maintainer candidate. The individual terminals are the same in terms of terminals owned by the maintenance side, and have the same functions as an input terminal or an output terminal.

The database 150 also includes an inspector candidate information table 152 that stores inspector candidate information regarding inspector candidates. The inspector candidate information table 152 stores information regarding each inspector candidate as one record. The information regarding the inspector candidate includes an inspection company name (a name of the inspector), an address, company information, an inspection history, an inspection fee, an inspection possible timing, the number of inspectors, and an evaluation result of the inspector. Here, the inspector may be an inspector of a company different from the producer, or may be an inspector employed by the producer (an inspector of an inspection department in the company). Except for the evaluation result, the information regarding the inspector candidate is mainly inputted by the inspector via the inspector side terminal 3 and registered in the database 150. The evaluation for the inspector can be inputted by the producer, for example, after a report of an inspection result is received. Evaluation items in the evaluation result include whether inspection has been performed according to an inspection plan, whether there is no error, omission, or the like in the inspection, whether an image at the time of the inspection has been able to be captured without any problem, and the like. Further, the control unit 11 may also calculate a time required for the inspection automatically from an inspection record (data from GPS or the like of the camera, and moving image data) uploaded by the inspector, extract found gas leakage and a repair record thereof, and extract the number of times of inspection of an inspector, to add these to the evaluation result of the inspector. By setting weighting for these evaluation items, the control unit 11 may calculate an evaluation value on the basis of a predetermined calculation formula and use the evaluation value as an evaluation result.

The database 150 also includes a producer information table 153 that stores producer information regarding producers. The producer information table 153 stores information regarding each producer as one record. The information regarding the producer includes a business company name, an address, a contact, and company information. The producer information is mainly inputted by the producer via the producer side terminal 2 and registered in the database 150.

The database 150 also includes an inspection-related information table 154 that stores inspection-related information regarding inspection. The inspection-related information table 154 stores information regarding each inspection as one record. The information regarding inspection includes information regarding an inspection plan, information regarding inspection of the production facility, and information (inspection support information) for inspection of the production facility.

The information regarding an inspection plan includes an inspector, an inspection timing (future), a production facility, an inspection schedule, and an inspection route (an order of production facilities to be inspected). Note that the information regarding an inspection plan may include information for inspection (inspection support information).

The information regarding inspection of a production facility includes information regarding an inspection target, setting information of an inspection device, and information regarding an imaging environment. The information regarding an inspection target includes a production facility as the inspection target, an inspection point (valve and pipe locations) of the production facility, the presence or absence of gas leakage, moving image data when captured by an infrared camera, and the like. The moving image data is tagged at a time of capturing an image of a gas leakage occurrence point. Note that these pieces of information regarding an inspection target are also an inspection record. The inspection record includes a file name of a moving image data, a storage location of the moving image data, an update date, a file size, and the like. The moving image data is stored in the storage unit 15, for example. The setting information of an inspection device includes a location of an imaging point, an imaging direction, imaging conditions (such as exposure, gain, focus, and sensor temperature), and the like. The information regarding an imaging environment includes weather, a temperature, a humidity, a wind speed, an atmospheric pressure, and the like, imaging date and time, and the like. Note that these pieces of information regarding an imaging environment are also an inspection record. These inspection records are inputted by the inspector via the terminal on the inspector side and registered in the database 150.

The information (inspection support information) for inspection of the production facility includes an important inspection point of the inspection, inspection target-related information regarding the production facility, setting information of an inspection device, a past inspection record, and the like. Here, the inspection target-related information regarding the production facility includes, for example, a list of inspection points in the production facility to be inspected, and a map of the production facility in which the inspection points can be seen. The setting information of an inspection device includes, for example, a location of an imaging point of the camera with respect to the inspection target, and an imaging direction.

The database 150 also includes a report format-related information table 155 that stores report format-related information regarding a report format. The report format-related information table 155 stores information regarding each report format as one record. The information regarding a report format stores a format for inputting items necessary for description of individual formats of a legal report, an inspection report, and a repair report.

The database 150 also includes a maintainer candidate information table 156 that stores maintainer candidate information regarding maintainer candidates. The maintainer candidate information table 156 stores information regarding each maintainer candidate as one record. The information regarding a maintainer candidate includes a maintenance company name (a name of a maintainer), an address, company information, a maintenance history, a maintenance fee, a maintenance possible timing, the number of maintainers, and an evaluation result of the maintainer. Here, the maintainer may be a maintainer of a company different from the producer, or may be a maintainer employed by the producer (a maintainer of a maintenance department in the company). Except for the evaluation result, the information regarding a maintainer candidate is mainly inputted by the maintainer via the maintainer side terminal 5 and registered in the database 150. The evaluation for the maintainer can be inputted via the producer side terminal 2, for example, after a maintenance record is received. Evaluation items in the evaluation result include whether maintenance has been performed according to a maintenance plan, whether there is no error, omission, or the like in the maintenance, whether a finish state is good, and the like.

When the communication unit 14 receives production facility information from the producer side terminal 2, the control unit 11 stores the production facility information in the production facility information table 151. Further, when the communication unit 14 receives inspector candidate information from the inspector candidate side terminal 3, the control unit 11 stores the inspector candidate information in the inspector candidate information table 152. Further, when the communication unit 14 receives producer information from the producer side terminal 2, the control unit 11 stores the producer information in the producer information table 153. Further, when the communication unit 14 receives maintainer candidate information from the maintainer candidate side terminal 5, the control unit 11 stores the maintainer candidate information in the maintainer candidate information table 156.

Next, a description is given to how the control unit 11 functions in a case of making an inspection plan for a production facility and in a case of transmitting the inspection plan.

The control unit 11 functions as the inspector candidate information acquisition unit. That is, the control unit 11 acquires the inspector candidate information from the inspector candidate information table 152. In addition, the control unit 11 functions as the production facility information acquisition unit. That is, the control unit 11 acquires the production facility information from the production facility information table 151. Then, the control unit 11 extracts a record in which an inspection timing (future) of the production facility coincides with an inspection possible timing. That is, the control unit 11 functions as the inspection-related information output unit that selects an inspector candidate satisfying a condition that the inspection timing coincides with the inspection possible timing, as an inspector that performs inspection on the production facility from among a plurality of inspector candidates. Here, "coincide" means that the inspection timing overlaps with the inspection possible timing at least in a time necessary for the inspection.

For example, a plurality of records may be extracted from the inspector candidate information table 152. That is, a plurality of inspector candidates may be selected. In this case, the control unit 11 may preferentially select, as an inspector, an inspector candidate whose distance to the production facility is short. The distance to the production facility is obtained from, for example, a location of the production facility as the production facility-related information and an address of the inspector candidate as the inspector candidate information. In this case, since the production facility to be inspected by the inspector candidate is close, the time and cost required for movement can be reduced, which enables improvement of the temporal and cost efficiency of the inspection.

In addition, for example, inspection may be individually performed on a plurality of production facilities managed by the same producer. In this case, the control unit 11 may select the same inspector candidate as an inspector that performs inspection on the plurality of production facilities managed by the same producer. This makes it possible to increase the efficiency of the inspection by making an inspection plan that enables to collectively perform the inspection for a plurality of production facilities having the same inspection timing and being in a certain distance range.

Note that, without limiting to this, the control unit 11 may select the same inspector candidate as an inspector of inspection of a plurality of production facilities managed by different producers. This makes it possible to make an inspection plan that enables the same inspector to inspect the plurality of production facilities. In a case where the producer individually requests inspection, it is difficult to make the inspection plan described above. In this case, by making the inspection plan described above, the inspector can ensure a job and efficiently inspect the plurality of production facilities. In addition, it is possible to avoid a situation in which a schedule of the inspector is occupied by a small number of producers.

There is a case where the inspection is not performed as planned for the inspection plan outputted by the control unit 11. Examples thereof include a case where repair work for gas leakage takes an unexpected time and the inspection is not completed, a case where a traffic trouble or the like occurs during movement, a case where convenience of a producer or an inspector suddenly deteriorates, or the like. Even in such a case, the control unit 11 can make an inspection plan again on the basis of the inspector candidate information stored in the database 150 in consideration of a timing at which the inspector can perform inspection.

The control unit 11 may also preferentially select, as an inspector, an inspector candidate having a high evaluation result. This allows an excellent inspector to be assigned to inspection, and the producer can ensure the quality of the inspection. In addition, the inspector can perform a job suitable for skills, and can increase motivation for the job by receiving an appropriate evaluation. Note that the evaluation (inspection history) is obtained on the basis of the information regarding the inspector candidate stored as a record in the inspector candidate information table.

The control unit 11 may select an inspector on the basis of information regarding inspection ability of an inspector candidate. The information regarding inspection ability of the inspector candidate includes, for example, the number of times of inspection of the inspector candidate or the number of years of engagement in inspection. The number of times of inspection of the inspector candidate or the number of years of engagement in inspection can also be referred to as inspection experience of the inspector candidate. The control unit 11 may preferentially select, as an inspector, an inspector candidate with more inspection experience. Note that, if an inspector candidate with less inspection experience is selected, the inspector candidate with less inspection experience may estimate a longer time required for one inspection to make an inspection plan. In addition, the control unit 11 may preferentially select, as an inspector, an inspector candidate having experience of inspecting a production facility to be inspected in the past. Furthermore, the control unit 11 may select an inspector on the basis of a scale of the production facility and the number of times of inspection of the inspector candidate corresponding to the scale. For example, in a case where the scale of the production facility is large, the control unit 11 may select an experienced inspector candidate with a large number of times of inspection as an inspector. In a case where the scale of the production facility is small, the control unit 11 may select an inspector candidate with less experience as an inspector. In a large-scale production facility, since there are many inspection points, it is necessary to efficiently perform the inspection. In such a case, it is possible to efficiently perform the inspection without delaying the inspection plan by selecting an experienced inspector candidate. Note that an inspector candidate with less experience may be selected for education of the inspector.

Furthermore, the control unit 11 may preferentially select an inspector with a low inspection fee. This can reduce a burden on the producer.

As described above, the control unit 11 desirably outputs information regarding the inspection plan in consideration of at least one of: whereabouts of the production facility; an address of the inspector candidate; an evaluation result of the inspector candidate; information regarding inspection ability of the inspector candidate; and an inspection fee. When the inspector candidate is selected using a plurality of items (conditions), a priority order may be assigned to each item. For example, in a case where a distance to the production facility is a first priority item and the number of times of inspection is a second priority item, inspector candidates within a predetermined distance are selected, and an inspector candidate having a largest number of times of inspection is selected from among the selected inspector candidates.

In addition, the inspector candidate may be selected by weighting and ranking individual items as a comprehensive evaluation value. In this case, a plurality of ranks are given for individual items. For example, a rank value is 5 points when the distance is short, and 4 points, . . . 1 point as the distance is longer. Ranking is performed by taking a sum of values obtained by multiplying the rank value by a weight, with the priority order of each item as the weight (an item with a high priority order has a relatively large weight).

The control unit 11 also has a function as the inspection-related information output unit that executes control for outputting inspection-related information including the selected inspector described above. Specifically, the control unit 11 controls the communication unit 14 to transmit an inspection plan for the production facility to the producer side terminal 2 and the inspector candidate side terminal 3. The inspection plan includes an inspector, an inspection timing, and a production facility as an inspection target.

The functions of the control unit 11 in a case of making an inspection plan for a production facility and in a case of transmitting the inspection plan have been described above.

Next, a description is given to functions of the control unit 11 in a case of making a maintenance plan (corresponding to "maintenance schedule information" of the present invention) for a production facility and in a case of transmitting the maintenance plan. Note that the control unit 11 in the case of making a maintenance plan and the case of transmitting the maintenance plan functions similarly to the control unit 11 in the case of making an inspection plan and the case of transmitting the inspection plan described above.

The control unit 11 functions as the maintainer candidate information acquisition unit. That is, the control unit 11 acquires maintainer candidate information from the maintainer candidate information table 156. In addition, the control unit 11 functions as the production facility information acquisition unit. That is, the control unit 11 acquires the production facility information from the production facility information table 151. Then, the control unit 11 extracts a record in which a maintenance timing (future) of the production facility coincides with a maintenance possible timing. That is, the control unit 11 functions as the maintenance-related information output unit that selects a maintainer candidate satisfying a condition that the maintenance timing coincides with the maintenance possible timing, as a maintainer that performs maintenance on the production facility, from among a plurality of maintainer candidates. Here, "coincide" means that the maintenance timing overlaps with the maintenance possible timing at least in a time necessary for the maintenance.

For example, a plurality of records may be extracted from the maintainer candidate information table 156. That is, a plurality of maintainer candidates may be selected. In this case, the control unit 11 may preferentially select, as a maintainer, a maintainer candidate whose distance to the production facility is short. The distance to the production facility is obtained from, for example, a location of the production facility as the production facility-related information and an address of the maintainer candidate as the maintainer candidate information. In this case, since the production facility to be maintained by the maintainer candidate is close, the time and cost required for movement can be reduced, which enables improvement of the temporal and cost efficiency of the maintenance.

In addition, for example, maintenance may be individually performed on a plurality of production facilities managed by the same producer. In this case, the control unit 11 may select the same maintainer candidate as a maintainer that performs maintenance on the plurality of production facilities managed by the same producer. This makes it possible to increase the efficiency of the maintenance by making a maintenance plan that enables to collectively perform the maintenance for a plurality of production facilities having the same maintenance timing and being in a certain distance range.

Note that, without limiting to this, the control unit 11 may select the same maintainer candidate as a maintainer of maintenance for a plurality of production facilities managed by different producers. This makes it possible to make a maintenance plan that enables the same maintainer to perform maintenance on the plurality of production facilities. In a case where the producer individually requests maintenance, it is difficult to make the maintenance plan described above. In this case, by making the maintenance plan described above, the maintainer can ensure a job and efficiently perform maintenance on the plurality of production facilities. In addition, it is possible to avoid a situation in which a schedule of the maintainer is occupied by a small number of producers.

There is a case where the maintenance is not performed as planned for the maintenance plan outputted by the control unit 11. Examples thereof include a case where repair work for gas leakage takes an unexpected time and the maintenance is not completed, a case where a traffic trouble or the like occurs during movement, a case where convenience of a producer or a maintainer suddenly deteriorates, or the like. Even in such a case, the control unit 11 can make a maintenance plan again on the basis of the maintainer candidate information stored in the database 150 in consideration of a timing at which the maintainer can perform maintenance.

The control unit 11 may also preferentially select, as a maintainer, a maintainer candidate having a high evaluation result. This allows an excellent maintainer to be assigned to maintenance, and the producer can ensure quality of maintenance. In addition, the maintainer can perform a job suitable for skills, and can increase motivation for the job by receiving an appropriate evaluation. Note that the evaluation (maintenance history) is obtained on the basis of the information regarding a maintainer candidate stored as a record in the maintainer candidate information table.

The control unit 11 may select a maintainer on the basis of information regarding maintenance ability of a maintainer candidate. The information regarding maintenance ability of the maintainer candidate includes, for example, the number of times of maintenance of a maintainer candidate or the number of years of engagement in maintenance. The number of times of maintenance of the maintainer candidate or the number of years of engagement in maintenance can also be referred to as maintenance experience of the maintainer candidate. The control unit 11 may preferentially select, as a maintainer, a maintainer candidate with more maintenance experience. Note that, if a maintainer candidate with less maintenance experience is selected, the maintainer candidate with less maintenance experience may estimate a longer time required for one maintenance to make a maintenance plan. Furthermore, the control unit 11 may preferentially select, as a maintainer, a maintainer candidate having experience of maintaining a production facility to be maintained in the past. Furthermore, the control unit 11 may select a maintainer on the basis of a scale of the production facility and the number of times of maintenance of the maintainer candidate corresponding to the scale. For example, in a case where the scale of the production facility is large, the control unit 11 may select an experienced maintainer candidate with a large number of times of maintenance as a maintainer. In a case where the scale of the production facility is small, the control unit 11 may select a maintainer candidate with less experience as a maintainer. In a large-scale production facility, since there are many maintenance points, it is necessary to efficiently perform the maintenance. In such a case, it is possible to efficiently perform the maintenance without delaying the maintenance plan by selecting an experienced maintainer candidate. Note that a maintainer candidate with less experience may be selected for education of the maintainer.

Further, the control unit 11 may preferentially select a maintainer with a low maintenance fee. This can reduce a burden on the producer.

As described above, the control unit 11 desirably outputs information regarding a maintenance plan in consideration of at least one of whereabouts of the production facility, an address of a maintainer candidate, an evaluation result of the maintainer candidate, information regarding maintenance ability of the maintainer candidate, or a maintenance fee. When the maintainer candidate is selected using a plurality of items (conditions), a priority order may be assigned to each item. For example, in a case where a distance to the production facility is a first priority item and the number of times of maintenance is a second priority item, maintainer candidates within a predetermined distance are selected, and a maintainer candidate having a largest number of times of maintenance is selected from among the selected maintainer candidates.

In addition, the maintainer candidate may be selected by weighting and ranking individual items as a comprehensive evaluation value. In this case, a plurality of ranks are given for individual items. For example, a rank value is 5 points when the distance is short, and 4 points . . . 1 point as the distance is longer. Ranking is performed by taking a sum of values obtained by multiplying the rank value by a weight, with the priority order of each item as the weight (an item with a high priority order has a relatively large weight).

The control unit 11 also has a function as the maintenance-related information output unit that executes control for outputting maintenance-related information including the selected maintainer described above. Specifically, the control unit 11 controls the communication unit 14 to transmit a maintenance plan for the production facility to the producer side terminal 2 and the maintainer candidate side terminal 5. The maintenance plan includes a maintainer, a maintenance timing, and a production facility as a maintenance target.

The producer side terminal 2 is, for example, a personal computer. As illustrated in FIG. 1, the producer side terminal 2 includes a control unit 21, an operation unit 22, a display unit 23, a communication unit 24, and a storage unit 25. Each unit is connected by a bus.

The control unit 21 includes a CPU, a RAM, and the like. The CPU of the control unit 21 reads various programs such as a system program and a processing program stored in the storage unit 25, develops the programs into the RAM, and executes various types of processing according to the developed programs.

In addition, the control unit 21 controls the communication unit 24 to transmit producer information and production facility information to the inspection support device 1. Furthermore, the control unit 21 controls the communication unit 24 to receive an inspection plan, an inspection record (including moving image data, information regarding an inspection target, and information regarding an imaging environment), and a legal report (described later) from the inspection support device 1. This allows the producer to confirm inspection scheduled for the production facility and the inspection record. In addition, the control unit 21 controls the communication unit 24 to receive maintenance-related information including a maintenance plan from the inspection support device 1. This allows the producer to confirm maintenance scheduled for the production facility and a maintenance record (maintenance completion).

The operation unit 22 includes a keyboard including character input keys, numeric input keys, various function keys, and the like, and a pointing device such as a mouse, and outputs a pressing signal of a key pressed in the keyboard and an operation signal by the mouse, to the control unit 21 as input signals.

The display unit 23 includes, for example, a monitor such as an LCD. The display unit 23 displays various screens in accordance with an instruction of a display signal inputted from the control unit 21.

The communication unit 24 includes, for example, a LAN card or the like. The communication unit 24 transmits and receives data to and from an external device connected to a communication network via a switching hub, for example.

The storage unit 25 includes, for example, a hard disk drive (HDD), a semiconductor non-volatile memory, or the like. The storage unit 25 stores a system program, a web browser, and the like as described above.

The inspector candidate side terminal 3 is, for example, a personal computer. As illustrated in FIG. 1, the inspector candidate side terminal 3 includes a control unit 31, an operation unit 32, a display unit 33, a communication unit 34, and a storage unit 35. Each unit is connected by a bus.

The control unit 31 includes a CPU, a RAM, and the like. The CPU of the control unit 31 reads various programs such as a system program and a processing program stored in the storage unit 35, develops the programs into the RAM, and executes various types of processing according to the developed programs.

In addition, the control unit 31 controls the communication unit 34 to transmit inspector candidate information to the inspection support device 1. In addition, the control unit 31 controls the communication unit 34 to receive inspection-related information including an inspection plan from the inspection support device 1. This allows the producer to confirm inspection scheduled for the production facility. In addition, the inspector candidate can confirm an inspector that performs the inspection scheduled for the production facility.

The operation unit 32 includes a keyboard including character input keys, numeric input keys, various function keys, and the like, and a pointing device such as a mouse, and outputs a pressing signal of a key pressed in the keyboard and an operation signal by the mouse, to the control unit 31 as input signals.

The display unit 33 includes, for example, a monitor such as an LCD. The display unit 33 displays various screens in accordance with an instruction of a display signal inputted from the control unit 31.

The communication unit 34 includes, for example, a LAN card or the like. The communication unit 34 transmits and receives data to and from an external device connected to a communication network via a switching hub, for example.

The storage unit 35 includes, for example, a hard disk drive (HDD), a semiconductor non-volatile memory, or the like. The storage unit 35 stores a system program, a web browser, and the like as described above.

With the configuration described above, the control unit 11 selects an inspector candidate satisfying a certain condition from among a plurality of inspector candidates, as an inspector that performs inspection on the production facility. This allows an inspection plan (including the inspector) to be made. The efficiency of the inspection can be increased by performing inspection according to the inspection plan.

FIG. 1 illustrates the camera 4. The camera 4 is connected via a cable to the inspector candidate side terminal 3 as the inspector side terminal. Note that the inspector side terminal may be a terminal different from the inspector candidate side terminal 3, or may be the same terminal.

The camera 4 includes an infrared camera (not illustrated). The infrared camera obtains a captured image (infrared image) in which leaked gas is visualized. Note that, since a configuration of the infrared camera capable of visualizing gas is known, the description thereof is omitted here. The control unit 31 has a function as an image processing unit that performs image processing on a captured image obtained by the infrared camera, to form an image in which the inspector can easily recognize a gas leakage point. For example, the control unit 31 (image processing unit) forms a heat distribution image (temperature information) on the basis of the captured image from the infrared camera, and extracts a portion considered to be gas outflow from the image. Note that what has been described here is an example of image processing by the control unit 31 (image processing unit), and the present invention is not limited thereto. The control unit 31 has a function as a display control unit that causes the display unit 33 to display an image after image processing. The image after image processing by the control unit 31 is inputted to the storage unit 35. In addition, a captured image from the camera 4 is inputted to the storage unit 35. That is, imaging data (a producer name, an inspector name, a facility name, an inspection point in the facility, longitude/latitude, a temperature, a humidity, and the like) for the production facility is stored in the storage unit 35. Note that, as described above, the moving image data is tagged at a time of capturing an image of a gas leakage occurrence point.

The imaging data for the production facility is transmitted from the inspector candidate side terminal 3 to the inspection support device 1 via a network line, and stored in the inspection-related information table 154. Further, the moving image data is transmitted from the inspector candidate side terminal 3 to the inspection support device 1 in association with the imaging data, and stored in the inspection-related information table 154 via a network line.

As a result of the inspection, when maintenance (for example, repair) for the production facility is required, it is necessary to contact a business operator that performs maintenance. In a case where target equipment is rental equipment, or in a case where an inspector is a contractor, the inspector cannot perform maintenance on the spot when a point requiring maintenance is found. Therefore, in accordance with the target facility and its failure situation, it is necessary to contact a facility manager, select a necessary business operator, contact the selected business operator, and request maintenance. That is, processing (takeover of work) after the inspection of the production facility is required.

In the present embodiment, the inspection support system 100 includes the maintainer candidate side terminal 5. The maintainer candidate side terminal 5 is, for example, a personal computer. As illustrated in FIG. 1, the maintainer candidate side terminal 5 includes a control unit 51, an operation unit 52, a display unit 53, a communication unit 54, and a storage unit 55. Each unit is connected by a bus.

The control unit 51 includes a CPU, a RAM, and the like. The CPU of the control unit 51 reads various programs such as a system program and a processing program stored in the storage unit 55, develops the programs into the RAM, and executes various types of processing according to the developed programs.

In addition, the control unit 51 controls the communication unit 54 to transmit maintainer candidate information to the inspection support device 1. In addition, the control unit 51 controls the communication unit 54 to receive maintenance-related information including a maintenance plan from the inspection support device 1. This allows the producer to confirm maintenance scheduled for the production facility. In addition, the maintainer candidate can confirm a maintainer that performs maintenance scheduled for the production facility.

The operation unit 52 includes a keyboard including character input keys, numeric input keys, various function keys, and the like, and a pointing device such as a mouse, and outputs a pressing signal of a key pressed in the keyboard and an operation signal by the mouse, to the control unit 51 as input signals.

The display unit 53 includes, for example, a monitor such as an LCD. The display unit 53 displays various screens in accordance with an instruction of a display signal inputted from the control unit 51.

The communication unit 54 includes, for example, a LAN card or the like. The communication unit 54 transmits and receives data to and from an external device connected to a communication network via a switching hub, for example.

The storage unit 55 includes, for example, a hard disk drive (HDD), a semiconductor non-volatile memory, or the like. The storage unit 55 stores a system program, a web browser, and the like as described above.

With the configuration described above, the control unit 11 selects a maintainer candidate satisfying a certain condition from among a plurality of maintainer candidates, as a maintainer that performs maintenance on the production facility. This allows a maintenance plan (including the maintainer) to be made. The efficiency of the maintenance can be increased by performing maintenance according to the maintenance plan.

Figure 2:
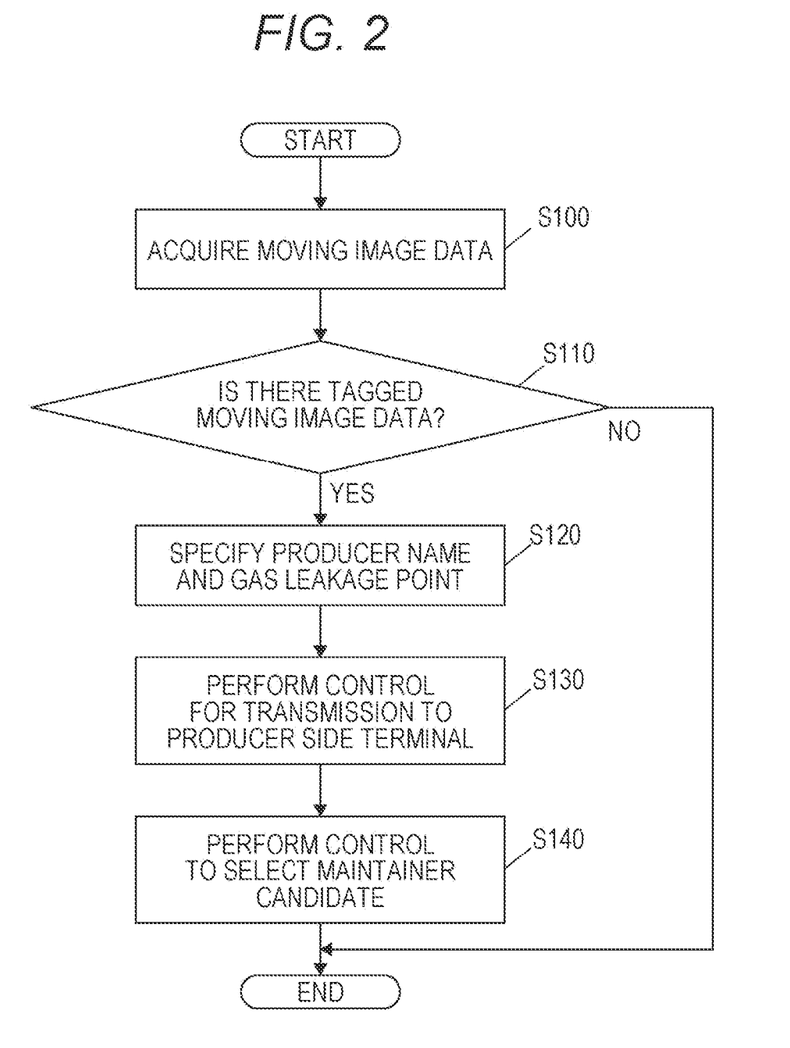
FIG. 2 is a flowchart illustrating an example of processing after inspection of a production facility.

Next, processing after inspection of a production facility in the present embodiment will be briefly described with reference to FIG. 2. FIG. 2 is a flowchart illustrating an example of processing after inspection of the production facility. This flow is started, for example, by executing a post-processing program.

In step S100, the control unit 11 acquires moving image data.

Next, in step S110, the control unit 11 determines whether or not there is tagged moving image data. When there is tagged moving image data (step S110: YES), the process proceeds to step S120. When there is no tagged moving image data (step S110: NO), the process illustrated in FIG. 2 ends.

In step S120, from contents recorded in imaging data associated with the tagged moving image data, the control unit 11 specifies a name of a producer of a production facility in which gas leakage occurs and a point (a production facility name, an equipment name, a location in the equipment).

Next, in step S130, the control unit 11 performs control to transmit information on occurrence of gas leakage or the like to the producer side terminal 2 of the producer that owns/manages the production facility in which the gas leakage occurs.

Next, in step S140, the control unit 11 performs control to select a maintainer candidate that performs maintenance on the production facility, in parallel with the transmission to the producer side terminal 2.

Figure 3:
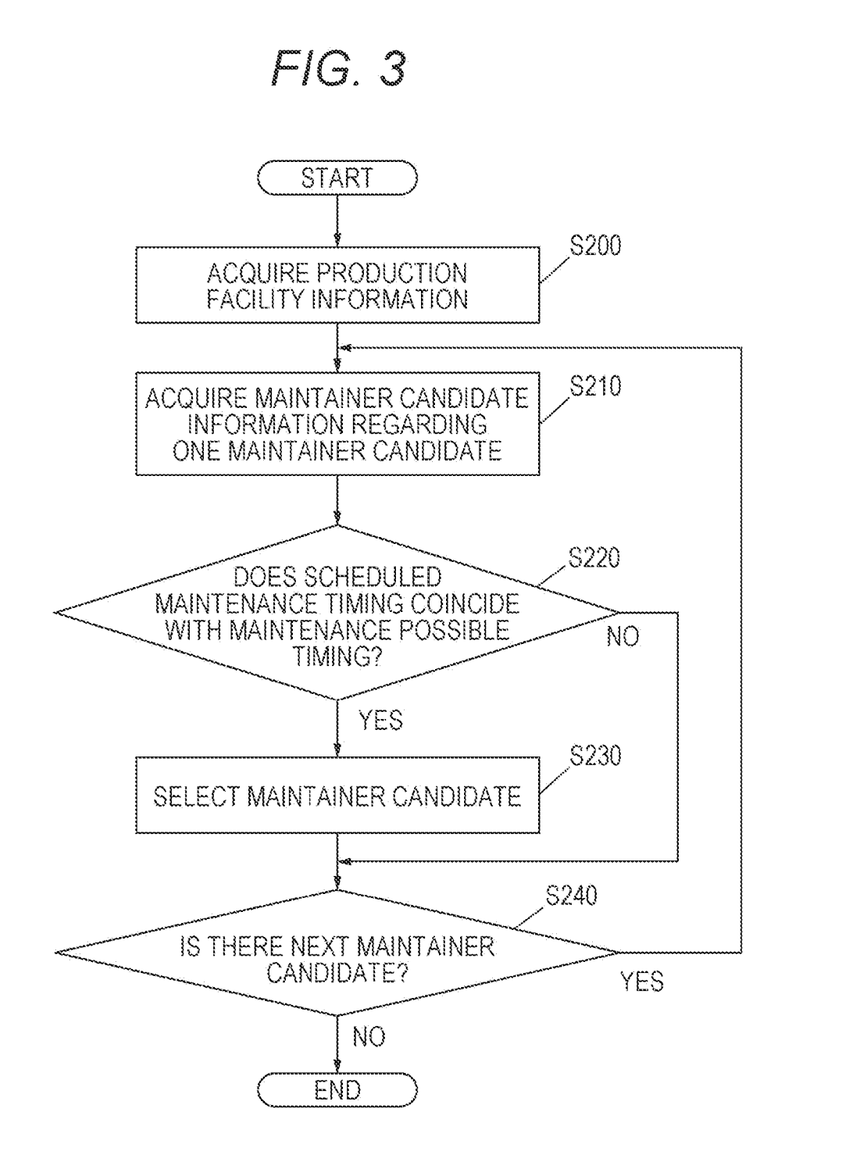
FIG. 3 is a flowchart illustrating a specific example of a process of selecting a maintainer candidate.

Next, a specific example of a process of selecting a maintainer candidate will be briefly described with reference to FIG. 3. FIG. 3 is a flowchart illustrating a specific example of the process of selecting a maintainer candidate. This flow is started, for example, by executing a program for creating a maintenance plan. Note that, as described above, maintenance here includes repair of a production facility and weeding in a production facility.

First, in step S200, the control unit 11 acquires the production facility information from the database 150.

Next, in step S210, the control unit 11 acquires the maintainer candidate information regarding one maintainer candidate, from the database 150.

Next, in step S220, the control unit 11 determines whether or not a scheduled maintenance timing coincides with a maintenance possible timing. When the scheduled maintenance timing coincides with the maintenance possible timing (step S220: YES), the process proceeds to step S230. When the scheduled maintenance timing does not coincide with the maintenance possible timing (step S220: NO), the process proceeds to step S240.

In step S230, the control unit 11 performs control to select a maintainer candidate that performs maintenance on the production facility. Note that, when the selection of the maintainer candidate is ended, similarly to the notification of the inspection plan (inspection request) to the inspector candidate after the selection of the inspector candidate is ended, the notification of a maintenance plan (maintenance request) to the selected maintainer candidate is given.

In step S240, the control unit 11 determines whether or not there is a next maintainer candidate. When there is a next maintainer candidate (step S240: YES), the process returns to before step S210. When there is no next maintainer candidate (step S240: NO), the process illustrated in FIG. 3 ends.

According to the processing after inspection according to the present embodiment, since a repair request is automatically notified to a repairer when there is registration of an inspection record indicating that maintenance for the production facility is necessary, a burden on takeover of work after the inspection is eliminated. In addition, it is possible to prevent omission (omission of repair request) in the processing after inspection. As a result, it is possible to reliably perform maintenance management of the production facility with a small work burden.

Note that, in the processing after inspection described above, a name of the producer of the production facility in which the gas leakage occurs and a point thereof are specified from the contents recorded in the imaging data associated with the tagged moving image data, but the present invention is not limited thereto. The gas leakage point may be specified only from the recorded imaging data without using the tagging of the moving image data. For example, an item (for example, a check box) for inputting a check indicating the presence of gas leakage may be provided in a format in which imaging data is recorded, and specification may be performed on the basis of the presence or absence of the check inputted to the item.

Further, in the processing after inspection, when association between the production facility in which the gas leakage occurs and a maintainer candidate (repairer) is registered, the control unit 11 may perform control to select the maintainer candidate.

In addition, in a case where association between the production facility and a maintainer candidate is not registered, the control unit 11 may perform control to select a business operator that has previously repaired or a business operator close to the production facility. Specifically, the control unit 11 performs control to select a maintainer candidate on the basis of information regarding a maintainer that has performed maintenance on the production facility. Further, the control unit 11 performs control to select a maintainer candidate on the basis of distance information derived from position information of the maintainer candidate side terminal 5 and position information of the production facility in which the gas leakage has occurred, a name of the production facility, and information regarding a maintainer candidate that has been recorded in advance. When the control for selecting a maintainer candidate is ended, the control unit 11 performs control to notify the maintainer candidate side terminal 5 owned by the selected maintainer candidate, of a maintenance plan (including a repair request). When the control for selecting a maintainer candidate is ended, the control unit 11 performs control to notify the producer side terminal 2 owned by the producer that owns/manages the production facility, of a maintenance plan (including the selected maintainer candidate).

<Modification>

Next, Modification 1 of the present embodiment will be described. In Modification 1, reinspection of gas leakage in a production facility is simply referred to as "reinspection".

After repair completion of a point where gas leakage has occurred, it is necessary to perform reinspection as to whether or not the gas leakage has been eliminated. That is, processing (takeover of work) after maintenance for the production facility is required. In Modification 1, when the repair of the point where the gas leakage has occurred is completed, the repairer inputs the repair completion via the maintainer candidate side terminal 5. The repair completion information is transmitted from the maintainer candidate side terminal 5 to the inspection support device 1 and registered in the database 150. When the repair completion information is registered in the database 150, the control unit 11 performs control to select an inspector who has previously performed inspection, as an inspector candidate that performs inspection on the production facility after repair. The control unit 11 performs control to make a reinspection plan (including the selected inspector described above) on the basis of an inspection possible timing of the inspector candidate and an inspection timing (future) of the production facility. Then, the control unit 11 performs control to transmit the reinspection plan to the producer side terminal 2, and performs control to transmit the reinspection plan to the inspector candidate side terminal 3. As a result, since the repair completion notification and the reinspection request are automatically performed, it is possible to reduce the burden on the takeover of work also from this point.

The inspector performs reinspection of the requested gas leakage point. The inspector inputs imaging data via the inspector candidate side terminal 3. The imaging data is transmitted to the inspection support device 1 and registered in the database 150. On the basis of the transmitted imaging data, the control unit 11 performs control to transmit the fact that the reinspection has been performed and the fact that the gas leakage has been eliminated to the producer, together with moving image data (which may be a still image) to the producer side terminal 2. Note that, in a case where the gas leakage has not been eliminated, a repair request is made again.

Next, Modification 2 of the present embodiment will be described.

For example, in shale well equipment or the like, the target equipment is outdoors or semi-outdoors, and overgrowth of weeds may be an obstacle to safe equipment management. For example, there are problems such as malfunction caused by biting of weeds into a sliding part, fire caused by entry of weeds into an electric facility, and the like. Since such a problem varies depending on a type of weeds, vegetation, and the like, individual measures are required, and there is a problem that it is difficult for producers having a large number of pieces of well equipment to comprehensively take measures. In Modification 2 of the present embodiment, a mode enabling communication to a weeding operator for a production facility will be described. This mode is similar to the mode that enables communication to the repairer for the production facility described above.

In Modification 2, the control unit 11 of the inspection support device 1 performs control to select a weeding operator when an inspection record (including moving image data) indicating that weeding in the production facility is necessary is inputted via the inspector candidate side terminal 3, and the inspection record is registered in the database 150. The communication unit 14 of the inspection support device 1 transmits a request for weeding, to the maintainer candidate side terminal 5 owned by the selected weeding operator. As a result, since the request for weeding is automatically transmitted to the weeding operator on the spot of the production facility, it is possible to eliminate a burden on takeover of work. In addition, it is possible to prevent a mistake in takeover of work.

Note that the moving image data is tagged at a time of capturing an image of a point where weeds are growing. The control unit 11 extracts the tagged moving image data, and specifies a name of a producer of a production facility in which weeding is necessary, and a point (a facility name, an equipment name, and a location in the equipment) from contents recorded in imaging data associated with the moving image data. Note that the necessity of weeding may be specified only from the recorded imaging data without using the tagging of the moving image data. For example, an item for checking the presence or absence of the necessity of weeding may be provided in a format in which the imaging data is recorded, and the specification may be performed from the presence or absence of the check. In addition, a notification indicating that weeding is necessary may be given to a producer (owner/manager) of the facility, based on information of a weeding target facility, equipment in the facility, and the weeds that are specified from imaging data.

Note that, in the control in which the control unit 11 selects the weeding operator, similarly to the case of selecting the repairer, an appropriate weeding operator may be selected from distance information derived from position information of a mobile terminal owned by the weeding operator and position information of a weeding facility, a name of the target production facility, and characteristic information of weeding operators registered in advance. In addition, in a case where the production facility or the equipment is associated with a weeding operator in advance, the associated weeding operator may be selected. Further, in a case where the production facility or the equipment is not associated with a weeding operator in advance, from among the registered weeding operators, selection may be made by assigning a priority order based on a weeding operator that has previously performed weeding, a weeding operator close to the production facility, a weeding operator with high evaluation, and the like. In addition, a weeding operator may register a weeding possible timing as in the inspection agency registers the inspection possible timing.

When the selection of the weeding operator is ended, the control unit 11 performs control to transmit a work request to the maintainer candidate side terminal 5 owned by the selected weeding operator.

The weeding operator inputs information indicating completion of the weeding work via the maintainer candidate side terminal 5. Note that a weeding result (a picture after completion of the weeding work) may be inputted through the maintainer candidate side terminal 5. The inputted weeding result is registered in the database 150. When reinspection is performed on the basis of the registered weeding record, it is not necessary for a reinspector to go to the production facility and perform the reinspection, so that it is possible to save time and effort for the reinspection.

The producer checks a finished state, evaluates the weeding operator, and inputs an evaluation result via the producer side terminal 2 owned by the producer. As a result, the input evaluation result is registered in the database 150 as maintainer candidate information, and is used as a basis for selecting a weeding operator.

After work completion, the weeding operator evaluates correctness of the determination on the necessity of weeding, and inputs an evaluation result via the maintainer candidate side terminal 5 owned by the weeding operator. The inputted evaluation result is registered in the database 150 as inspector candidate information, and is used as a basis for selecting an inspector candidate.

Note that, as auxiliary means for inputting information regarding weeds, means for automatically recognizing information regarding weeds on the basis of an image of the camera 4 used for gas leakage inspection of the production facility may be used. In addition, in a case where the information on weeds is automatically recognized, the information on weeds may be automatically inputted, or an alert prompting the input may be outputted. This can prevent input omission. Note that the picture after weeding is transmitted from the maintainer candidate side terminal 5 of the weeding operator to the inspection support device 1, registered (stored) in the storage unit 15 of the inspection support device 1, and transmitted from the inspection support device 1 to the producer side terminal 2.

Next, Modification 3 will be described. Note that, it is assumed that an inspection plan and a maintenance plan are transmitted from the inspection support device 1 to the producer side terminal 2. Similarly, it is assumed that a maintenance plan is transmitted from the inspection support device 1 to the maintainer candidate side terminal 5. The inspection plan includes an inspector candidate and an inspection period for performing inspection (including reinspection) on the production facility. In addition, the maintenance plan includes a maintainer candidate and a maintenance period for performing maintenance (including repair and weeding) on the production facility.

The control unit 21 controls the display unit 23 to display an inspection plan and a maintenance plan by a predetermined operation. This allows the inspection plan and the maintenance plan to be visualized. As a result, the producer can confirm the visualized inspection plan and maintenance plan.

In addition, the control unit 31 controls the display unit 33 to display the maintenance plan by a predetermined operation. This allows the maintenance plan to be visualized. As a result, the maintainer can reliably execute the visualized maintenance plan.

Next, a specific example of display processing of an inspection plan and the like will be described with reference to FIG. 4. In an upper part of FIG. 4, a horizontal axis represents time, and a vertical axis represents a type of a site. In the upper part of FIG. 4, an inspection plan and a maintenance plan at each of sites A, B, C, and D of a producer PPP are illustrated.

The control unit 21 controls the display unit 23 to display the inspection plan and the maintenance plan in each of the sites A, B, C, and D. The producer PPP can confirm inspection, repair, and reinspection scheduled on Mar. 8, 2019 (the current day) on the basis of the displayed inspection plan and maintenance plan. Specifically, the producer PPP can confirm that an inspection company YYY will inspect the site D in the morning of the current day and reinspect the site A in the afternoon of the current day. In addition, the producer PPP can confirm that a repairer XXX will repair the site A in the morning of the current day and repair the site C in the afternoon of the current day.

Figure 4:
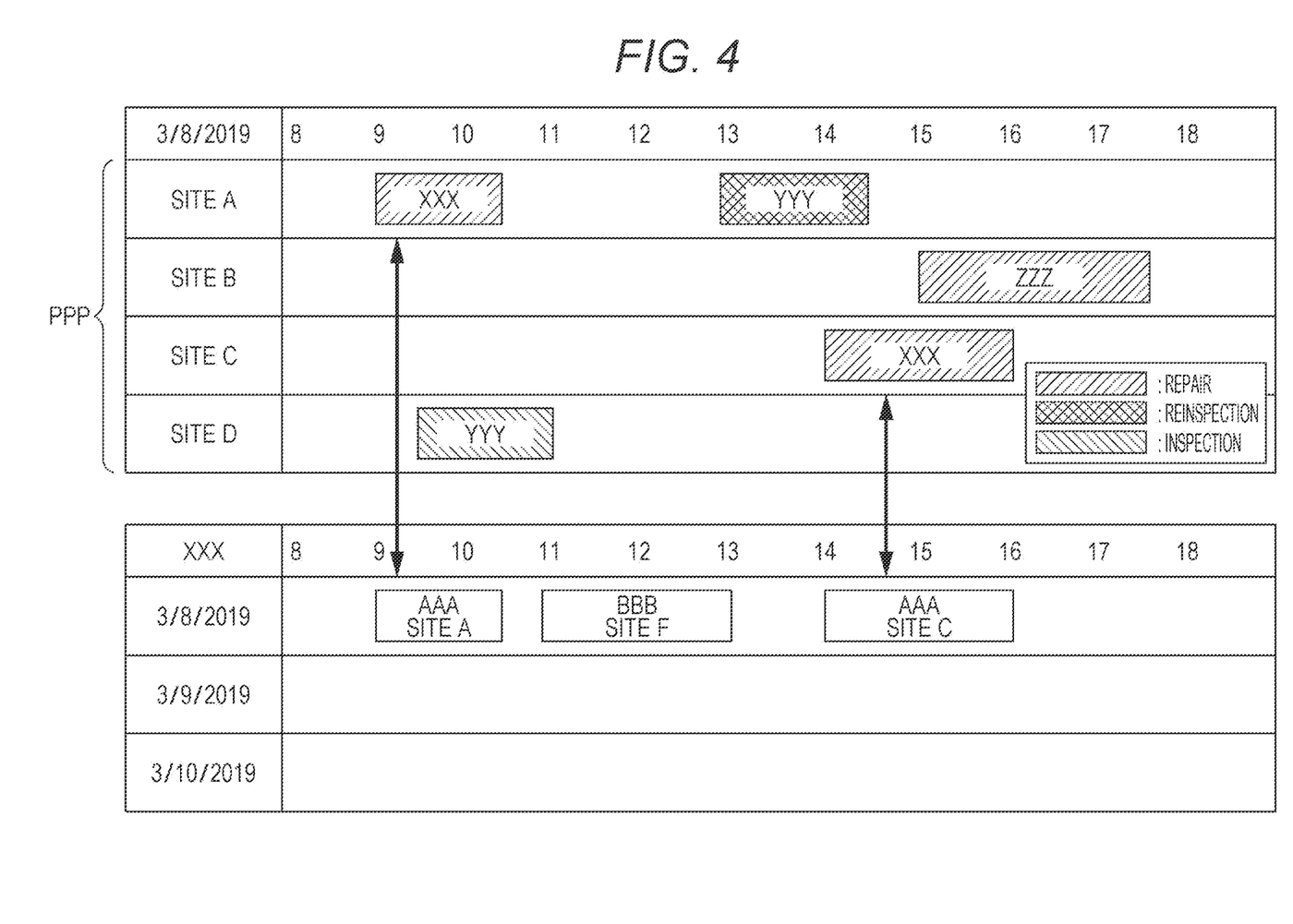

In a lower part of FIG. 4, a horizontal axis represents time, and a vertical axis represents date. In the lower part of FIG. 4, a schedule of each of repair workers AAA and BBB of the repairer XXX is illustrated. The control unit 31 controls the display unit 33 to display the schedules of the repair workers AAA, BBB, and the like of the repairer XXX. The repairer XXX can confirm repair scheduled for Mar. 8, 2019 (the current day) on the basis of the displayed maintenance plan. Specifically, the repairer XXX can confirm that the repair worker AAA will repair the site A in the morning of the current day and will repair the site C in the afternoon of the current day.

In addition, each of the above embodiments is merely an example of implementation in carrying out the present invention, and the technical scope of the present invention should not be construed in a limited manner by these. That is, the present invention can be implemented in various forms without departing from the scope or main features of the present invention.

The entire disclosure of the specification, drawings, and abstract included in Japanese Patent Application No. 2019-114517 filed on Jun. 20, 2019 is incorporated herein by reference.

REFERENCE SIGNS LIST

1 Inspection support device
2 Producer side terminal
3 Inspector candidate side terminal
4 Camera
5 Maintainer candidate side terminal
11, 21, 31, 51 Control unit
12, 22, 32, 52 Operation unit
13, 23, 33, 53 Display unit
14, 24, 34, 54 Communication unit
15, 25, 35, 55 Storage unit
100 Inspection support system
150 Database
151 Production facility information table
152 Inspector candidate information table
153 Producer information table
154 Inspection-related information table
155 Report format-related information table
156 Maintainer candidate information table

The invention claimed is:

1. A maintenance management method related to maintenance management of a production facility related to gas or oil, the maintenance management method comprising:
maintaining, by a hardware processor, a database including information regarding a producer that owns or manages the production facility, information on the production facility, and information on maintainer candidates which are candidates for performing maintenance on the production facility, the information on the maintainer candidates including a maintenance possible timing at which the maintainer candidate can perform maintenance;
receiving, by the hardware processor, an inspection record that comprises moving image data of a gas leakage occurrence point at the production facility and information indicating that maintenance for the production facility including repair of a gas leakage is necessary;
selecting, by the hardware processor, a maintainer candidate to perform repair of the gas leakage at the production facility that is necessary according to the inspection record, based on the information on the production facility and the information on the maintainer candidates in the database, using a plurality of different weighted criteria, the criteria including whether a maintenance timing coincides with the maintenance possible timing in the information on the maintainer candidates; and
executing control, by the hardware processor, to automatically communicate a repair request to repair the gas leakage, to the selected maintainer candidate.

2. The maintenance management method according to claim 1, wherein the hardware processor executes control to communicate information regarding the repair of the gas leakage at the production facility to both the producer and the selected maintainer candidate.

3. The maintenance management method according to claim 1, wherein the hardware processor acquires information indicating an end of the repair of the gas leakage at the production facility, and executes control to communicate information for requesting reinspection of the production facility to an inspector that has performed inspection on the production facility.

4. The maintenance management method according to claim 1, wherein the criteria used to select the maintainer candidate further includes information on one or more of: distance of the maintainer candidate to the production facility, whether or not the maintainer candidate performs maintenance for multiple production facilities of the producer, an evaluation result of past work of the maintainer candidate, maintenance abilities or experience of the maintainer candidate, and cost of maintenance by the maintainer candidate; and
wherein said information further included in the criteria is information that is included in the information on maintainer candidates in the database.

5. The maintenance management method according to claim 1, wherein, in the received inspection record, the information indicating that maintenance for the production facility including repair of the gas leakage is necessary is information that is attached at a time of capturing an image of the gas leakage occurrence point related to the production facility.

6. A maintenance management device comprising:
a storage that stores information regarding a producer that owns or manages a production facility related to gas or oil, information on the production facility, and information on maintainer candidates which are candidates for performing maintenance on the production facility, the information on the maintainer candidates including a maintenance possible timing at which the maintainer candidate can perform maintenance; and
a hardware processor that:
receives an inspection record that comprises moving image data of a gas leakage occurrence point at the production facility and information indicating that maintenance for the production facility including repair of a gas leakage is necessary;
selects a maintainer candidate to perform repair of the gas leakage at the production facility that is necessary according to the inspection record, based on the information on the production facility and the information on the maintainer candidates in the storage, using a plurality of different weighted criteria, the criteria including whether a maintenance timing coincides with the maintenance possible timing in the information on the maintainer candidates; and
automatically outputs a repair request to repair the gas leakage, to the selected maintainer candidate.

7. The maintenance management device according to claim 6, wherein the hardware processor outputs information regarding the repair of the gas leakage at the production facility, to both the terminal related to the producer and the terminal related to the selected maintainer candidate.

8. The maintenance management device according to claim 6, wherein when information indicating an end of the repair of the gas leakage at the production facility is acquired, the hardware processor outputs information for requesting reinspection of the production facility, to a terminal related to an inspector having performed inspection on the production facility.

9. The maintenance management device according to claim 6, wherein the criteria used by the hardware processor to select the maintainer candidate further includes information on one or more of: distance of the maintainer candidate to the production facility, whether or not the maintainer candidate performs maintenance for multiple production facilities of the producer, an evaluation result of past work of the maintainer candidate, maintenance abilities or experience of the maintainer candidate, and cost of maintenance by the maintainer candidate; and wherein said information further included in the criteria is information that is included in the information on maintainer candidates in the storage.

10. The maintenance management device according to claim 6, wherein, in the received inspection record, the information indicating that maintenance for the production facility including repair of the gas leakage is necessary is information that is attached at a time of capturing an image of the gas leakage occurrence point related to the production facility.

11. A non-transitory recording medium storing a computer readable maintenance management program that is executable to cause a hardware processor to perform processes comprising:

maintaining a database including information regarding a producer that owns or manages a production facility related to gas or oil, information on the production facility, and information on maintainer candidates which are candidates for performing maintenance on the production facility, the information on the maintainer candidates including a maintenance possible timing at which the maintainer candidate can perform maintenance;

receiving an inspection record that comprises moving image data of a gas leakage occurrence point at the production facility and information indicating that maintenance for the production facility including repair of a gas leakage is necessary;

selecting a maintainer candidate to perform repair of the gas leakage at the production facility that is necessary according to the inspection record, based on the information on the production facility and the information on the maintainer candidates in the database, using a plurality of different weighted criteria, the criteria including whether a maintenance timing coincides with the maintenance possible timing in the information on the maintainer candidates; and automatically outputting a repair request to repair the gas leakage, to the selected maintainer candidate.

12. The non-transitory recording medium according to claim 11, wherein the criteria used to select the maintainer candidate further includes information on one or more of: distance of the maintainer candidate to the production facility, whether or not the maintainer candidate performs maintenance for multiple production facilities of the producer, an evaluation result of past work of the maintainer candidate, maintenance abilities or experience of the maintainer candidate, and cost of maintenance by the maintainer candidate; and wherein said information further included in the criteria is information that is included in the information on maintainer candidates in the database.

13. The non-transitory recording medium according to claim 11, wherein, in the received inspection record, the information indicating that maintenance for the production facility including repair of the gas leakage is necessary is information that is attached at a time of capturing an image of the gas leakage occurrence point related to the production facility.

* * * * *